April 15, 1958     H. J. FORTUNE     2,830,460
GRAMOPHONE DRIVING MECHANISM
Filed Dec. 15, 1953
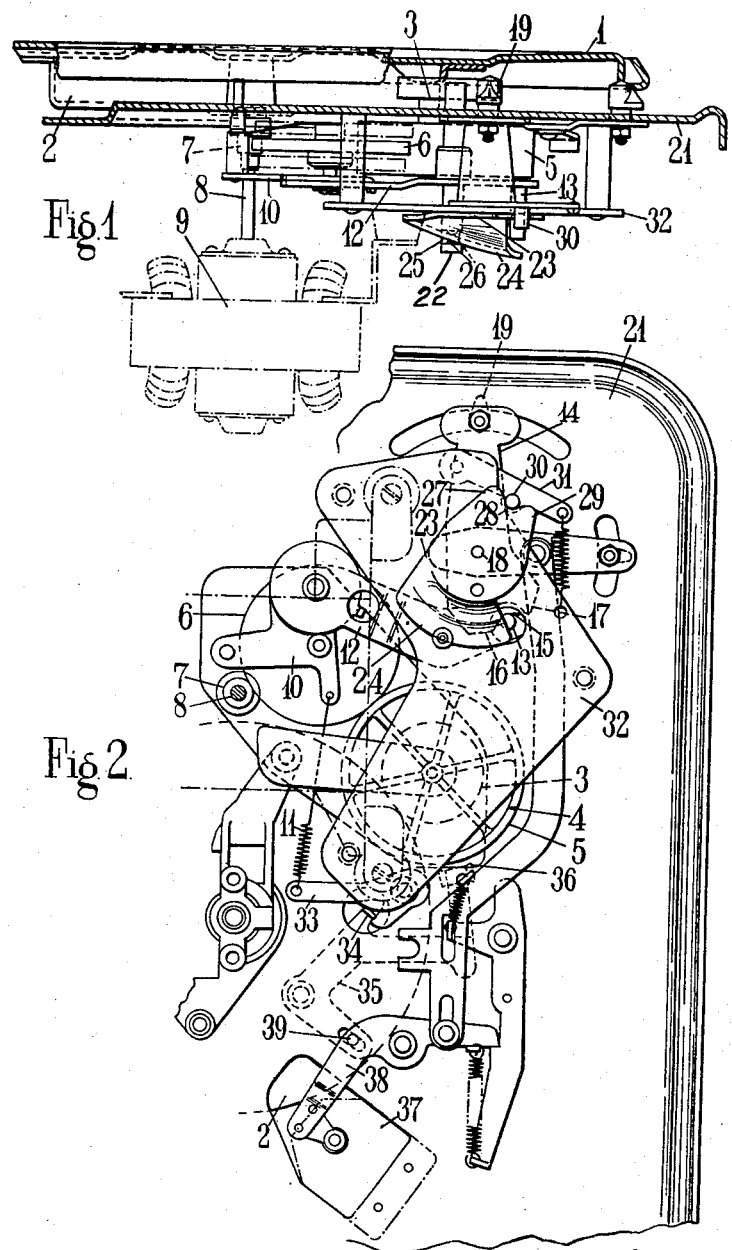

United States Patent Office
2,830,460
Patented Apr. 15, 1958

2,830,460

GRAMOPHONE DRIVING MECHANISM

Henry James Fortune, Swindon, England, assignor to The Garrard Engineering and Manufacturing Company, Limited, Swindon, England Application December 15, 1953, Serial No. 398,375

Claims priority, application Great Britain January 2, 1953

4 Claims. (Cl. 74—200)

This invention relates to the driving mechanism or transmission for the turntables of gramophones wherein means are provided whereby the turntable may be driven at varying speeds conforming to the record being played for example speeds of 33⅓, 45 and 78 R. P. M.

In known mechanism the spindle of the driving motor is provided with a 3-step pulley and the drive from such pulley to the driving rim of the turntable is effected through an intermediate rubber tyred wheel which is vertically displaceable to engage any of the steps of the pulley.

Such an arrangement has certain disadvantages in that the driving rim of the turntable has to be made of a depth to accommodate the vertical displacement of the intermediate wheel. Further, in order to obtain the desired reduction in speed the driving rim of the turntable has to be of a comparatively large diameter of the order of 10″.

The object of the present invention is to provide an improved driving or transmission means whereby the disadvantages referred to above are avoided.

The invention consists in gramophone turntable driving mechanism comprising a stepped pulley driven by a motor, a transmission member having a part in driving engagement with the driving rim of the turntable, an intermediate wheel driven by said pulley and vertically displaceable to engage the various steps of the stepped pulley and engaging the transmission member at a part which is of a depth conforming to the displacement of said wheel.

Preferably the transmission member comprises a speed reduction element having a part of smaller diameter engaging the driving rim of the turntable and a part of larger diameter engageable by the intermediate wheel.

In the accompanying drawings:

Figure 1 is an elevation of the turntable driving mechanism according to the invention;

Figure 2 is an inverted plan.

In carrying the invention into effect according to one convenient mode by way of example, the turntable 1 is provided with a driving rim 2 of normal diameter and depth. In driving engagement is a transmission member preferably comprising a speed reduction element 4 having an upper smaller wheel 3 engaging the rim 2.

The speed reduction element 4 is mounted to rotate on a vertical axis and has a lower wheel 5 of larger diameter which is adapted to be driven by a vertically displaceable intermediate wheel 6. The depth of the lower wheel 5 of the speed reduction unit 4 is suitable to accommodate the intermediate wheel 6 in all its adjusted vertical positions which will correspond to the desired speeds of the turntable.

The intermediate wheel 6 is adapted to be driven from a stepped pulley 7 mounted on the spindle 8 of a driving motor 9. The stepped pulley 7 is provided with three steps corresponding to 78, 45 and 33⅓ R. P. M.

The intermediate wheel 6 is carried by a suitable mounting 10 whereby it may be laterally displaced out of engagement with the stepped pulley 7 and speed reduction element 5 when vertically displacing it for changing the speed, spring means 11 being provided for biasing the wheel into driving engagement.

The appropriate wheels are provided with rubber tyres or rims to provide a friction drive.

Speed control means may be provided by the application of a slight braking effect to the lower larger diameter part 5 of the speed reduction element 4. Such may be applied by a felt pad mounted upon a spring blade, pressure being controlled by an adjustable cam engaging the blade. At maximum speed the pressure will be at zero.

The mounting 10 for the intermediate wheel 6 is carried by a pivoted plate lever 12 having a pin 13 which cooperates with an actuating arm 14 provided with a notch 15 and cam faces 16 and 17. The arm 14 is pivoted at 18 and has an indicator button portion 19 extending through a slot 20 in the motor or unit board 21.

The plate lever 12 is carried by a post 22 which is capable of vertical adjustment. The plate lever pivots about the axis of the post.

The pivotal displacement of the plate lever to bring the intermediate wheel 6 into and out of engagement with the stepped pulley 7 and speed reduction member 3 are effected by the camming action of the surfaces of the notch 15 and the surfaces 16 and 17 of the actuating arm 14.

Thus with the pin 13 in the notch 15 as shown in Figure 2 the intermediate wheel engages the intermediate step of the pulley 7 (corresponding to the speed of 45 revolutions per minute). When the arm 14 is moved clockwise as seen in Figure 2 the pin 13 rides out of the notch 15 and pivots the plate 12 breaking the driving engagement between the intermediate wheel 6, the stepped pulley 7 and member 3. Thereafter on completing the movement of the actuating arm 14, the pin 13 runs down the surface 17 to engage the wheel 6 with another step of the pulley 7 and the member 3. Similarly when the actuating arm 14 is moved anti-clockwise as seen in Figure 2 the pin 13 rides out of the notch 15 breaking the driving engagement and then runs down surface 16 to re-engage the wheel 6 with the stepped pulley 7 and member 3.

It will be appreciated that during the free position of the wheel 6 a vertical displacement is imparted thereto. This movement is effected by a helical cam member 24 which engages opposed surfaces in a lateral recess 25 in the post 22 such surfaces being provided by balls 26.

The cam 24 is rotated by the actuating arm 14 and the cam plate 23 is formed with indexing formations 27, 28, 29 adapted for engagement by a pin 30 on a spring biased arm 31.

The various parts of the mechanism are mounted upon a plate 32 secured to and beneath the motor or unit plate 21.

The spring 11 is conveniently anchored to one arm of a pivoted lever 33 the other arm of which engages a detent 34 of a pivoted brake lever 35 having a pad 36 which is adapted to engage the driving surface 2 of the turntable when the motor switch 37 is in the opened position. The brake lever 35 is operatively connected to the switch lever 38 by a pin and slot 39 so that the brake pad is held "off" when the motor is running. In Figure 2 the switch is shown "in."

While it is preferred to employ a speed reduction element whereby the driving rim of the turntable may be kept to the normal diameter, it will be appreciated that the invention may be applied to a turntable having a driving rim of larger diameter, in which case the speed reduction feature may not be required, the element being of uniform diameter.

I claim:

1. A gramophone turntable driving mechanism comprising a driving motor having an output spindle; a stepped pulley secured on said spindle; a rotatably mounted transmission member having a part in driving engagement with the driving rim of the turntable; an intermediate wheel driven by said pulley and driving the transmission member; a support element rotatably supporting said intermediate wheel and mounted to oscillate about a pivot spaced from and parallel to the axis of said intermediate wheel, said support element being displaceable axially of its mounting pivot; and a speed selector operatively associated with said support element and its pivot and constructed and arranged to conjointly oscillate said support element to disengage said intermediate wheel from said pulley and transmission member and to move said mounting pivot axially, and then to re-engage said intermediate wheel with said pulley and transmission member to selectively engage said intermediate wheel with any of the steps of said pulley; said intermediate wheel engaging said transmission member at an axially extended part thereof having an axial length conforming to the axial displacement of said intermediate wheel.

2. A gramophone turntable driving mechanism as claimed in claim 1, wherein the transmission member comprises a speed reduction element having a part of smaller diameter engaging the driving rim of the turntable and a part of larger diameter engaging the intermediate wheel, the depth of said part of larger diameter conforming to the displacement of said wheel.

3. A gramophone turntable driving mechanism as claimed in claim 1 including cam means on said speed selector respectively engageable with said support element and its mounting pivot.

4. A gramophone turntable driving mechanism as claimed in claim 1, wherein the intermediate wheel is mounted upon a pivoted plate lever, constituting the support element, and the lateral displacements of said wheel are effected by an oscillating cam on said speed selector engaging a pin on said plate lever, the vertical displacements of said wheel being effected by an oscillating helical cam on said speed selector engaging a recess in the pivot on which the plate lever is mounted.

References Cited in the file of this patent

UNITED STATES PATENTS

| | | |
|---|---|---|
| 2,438,265 | Metzner | Mar. 23, 1948 |
| 2,584,580 | Hardy | Feb. 5, 1952 |
| 2,588,807 | Da Costa | Mar. 11, 1952 |